US011186131B2

(12) United States Patent
Warmerdam et al.

(10) Patent No.: US 11,186,131 B2
(45) Date of Patent: Nov. 30, 2021

(54) LIGHTWEIGHT SUSPENSION UPRIGHT ASSEMBLY FOR A VEHICLE

(71) Applicants: Aktiebolaget SKF, Gothenburg (SE); SKF Aerospace France S.A.S, Montigny-le-Bretonneux (FR)

(72) Inventors: Michiel Warmerdam, Loenen (NL); Marco Falossi, San Raffaele Cimena (IT); Remi Sarlin, Allex (FR)

(*) Notice: Subject to any disclaimer, the term of this patent is extended or adjusted under 35 U.S.C. 154(b) by 99 days.

(21) Appl. No.: 16/509,934

(22) Filed: Jul. 12, 2019

(65) Prior Publication Data
US 2020/0047576 A1 Feb. 13, 2020

(30) Foreign Application Priority Data

Aug. 8, 2018 (IT) .................. 102018000007974

(51) Int. Cl.
*B60G 7/00* (2006.01)
*B62D 7/18* (2006.01)
(Continued)

(52) U.S. Cl.
CPC .............. *B60G 7/008* (2013.01); *B62D 7/18* (2013.01); *F16C 17/02* (2013.01);
(Continued)

(58) Field of Classification Search
CPC .... B60G 7/008; B60G 3/18; B60G 2204/143; B60G 2204/148; B60G 2206/012; B60G 2206/7101; B60G 2206/50; B60G 2206/85; B60G 7/001; B62D 7/18; F16C 17/02; F16C 2326/02; F16C 2208/82; F16C 19/185; F16C 2326/05; F16D 55/00;
(Continued)

(56) References Cited

U.S. PATENT DOCUMENTS

| 4,650,620 A * | 3/1987 | Owen ................... B29C 44/12 264/137 |
| 2012/0049477 A1* | 3/2012 | Webster ................. B62D 7/18 280/93.512 |

(Continued)

FOREIGN PATENT DOCUMENTS

| GB | 2154520 | 9/1985 |
| JP | 3705384 | 10/2005 |
| WO | 2015106990 | 7/2015 |

OTHER PUBLICATIONS

Alan Bank et al., "COMPOSITE", Blog Post, p. 1-4, retrieved from the Internet: URL:https://www.compositesworld.com/cdn/cm/s/ford_motor_composite_knuckle_official_report_3.pdf, Apr. 4, 2019.
(Continued)

*Primary Examiner* — Drew J Brown
(74) *Attorney, Agent, or Firm* — Reed Smith LLP

(57) ABSTRACT

A suspension upright assembly for a vehicle provides a wheel hub bearing and a suspension upright including a fiber-reinforced composite bushing arranged around the wheel hub bearing, attachment members for attaching the suspension upright to a suspension assembly and to a brake caliper of the vehicle, and a fiber-reinforced composite truss-structure that connects at least one of the attachment members to the bushing and/or to a further one of the attachment members.

11 Claims, 3 Drawing Sheets

(51) Int. Cl.
  *F16C 17/02* (2006.01)
  *B60B 27/00* (2006.01)
  *B60B 27/02* (2006.01)
  *B60G 3/18* (2006.01)
  *F16D 55/00* (2006.01)

(52) U.S. Cl.
  CPC ............ *B60B 27/0078* (2013.01); *B60B 27/02* (2013.01); *B60G 3/18* (2013.01); *B60G 2204/143* (2013.01); *B60G 2204/148* (2013.01); *B60G 2206/012* (2013.01); *B60G 2206/7101* (2013.01); *F16C 2326/02* (2013.01); *F16D 55/00* (2013.01); *F16D 2055/0008* (2013.01)

(58) Field of Classification Search
  CPC ......... F16D 2055/0008; B60B 27/0078; B60B 27/02; B60B 27/00; Y02T 10/86
  See application file for complete search history.

(56) References Cited

U.S. PATENT DOCUMENTS

| | | | |
|---|---|---|---|
| 2014/0197678 A1* | 7/2014 | Olivieri | B60B 27/0084 301/110 |
| 2016/0121927 A1* | 5/2016 | Schaake | B60B 27/00 280/93.512 |
| 2017/0210418 A1* | 7/2017 | Sakuma | B62D 7/18 |
| 2020/0047575 A1* | 2/2020 | Sarlin | B29C 45/14336 |
| 2020/0047795 A1* | 2/2020 | Falossi | F16C 33/64 |
| 2020/0047796 A1* | 2/2020 | Falossi | B29C 70/86 |

OTHER PUBLICATIONS

International Search Report for Italy Patent Application No. 201800007974.
Eickhoff, et al., "Development of a Fiber-Composite Suspension Strut/Knuckle Module", pp. 267-280.

* cited by examiner

LIGHTWEIGHT SUSPENSION UPRIGHT ASSEMBLY FOR A VEHICLE

CROSS-REFERENCE TO RELATED APPLICATIONS

This application claims priority to Italian patent application no. 102018000007974 filed on Aug. 8, 2018, the contents of which are fully incorporated herein by reference.

FIELD OF THE INVENTION

The present invention is relative to a lightweight suspension upright assembly for a vehicle.

BACKGROUND OF THE INVENTION

As known, suspension uprights or knuckles are vehicle components that are designed to connect a wheel hub bearing to suspensions and are normally made of cast iron or lightweight alloy.

However, in the interest of reducing the global weight of vehicles for fuel economy reasons, there is an increasing drive within the automotive industries in manufacturing suspension uprights that include lighter materials such as polymer composite compounds.

In particular, some research efforts have been spent in the past for manufacturing suspension uprights samples made of a single composite material such as a ready-to-mold sheet molding compound (SMC).

Besides, the automotive company Ford has published a technical note entitled "Composite-lightweight rear suspension knuckle for a high-volume passenger vehicle", in which a technique is proposed for manufacturing multi-material suspension uprights that overcome the drawbacks of SMC suspension uprights related to high cure times and lack of mechanical properties.

Such technique involves the co-molding of SMC and layers of pre-impregnated composite fibers (typically called "pre-pregs").

The result of such co-molding is a lightweight and high strength suspension upright, although the related manufacturing costs and complexity can increase.

In this technical background, the need is felt to design a cost-effective composite suspension upright that is easy to be manufactured, but still having comparable weight, mechanical properties, and reliability with respect to known co-molded suspension uprights.

The object of the present invention is to provide a lightweight suspension upright assembly for a vehicle, which responds to the abovementioned need.

BRIEF SUMMARY OF THE INVENTION

According to an aspect of the present invention, a lightweight suspension upright assembly for a vehicle is provided, as defined in the attached claim 1.

BRIEF DESCRIPTION OF THE SEVERAL VIEWS OF THE DRAWING

The present invention will now be described with reference to the accompanying drawings, which show a non-limiting embodiment thereof, in which.

DETAILED DESCRIPTION OF THE INVENTION

Figure 1:
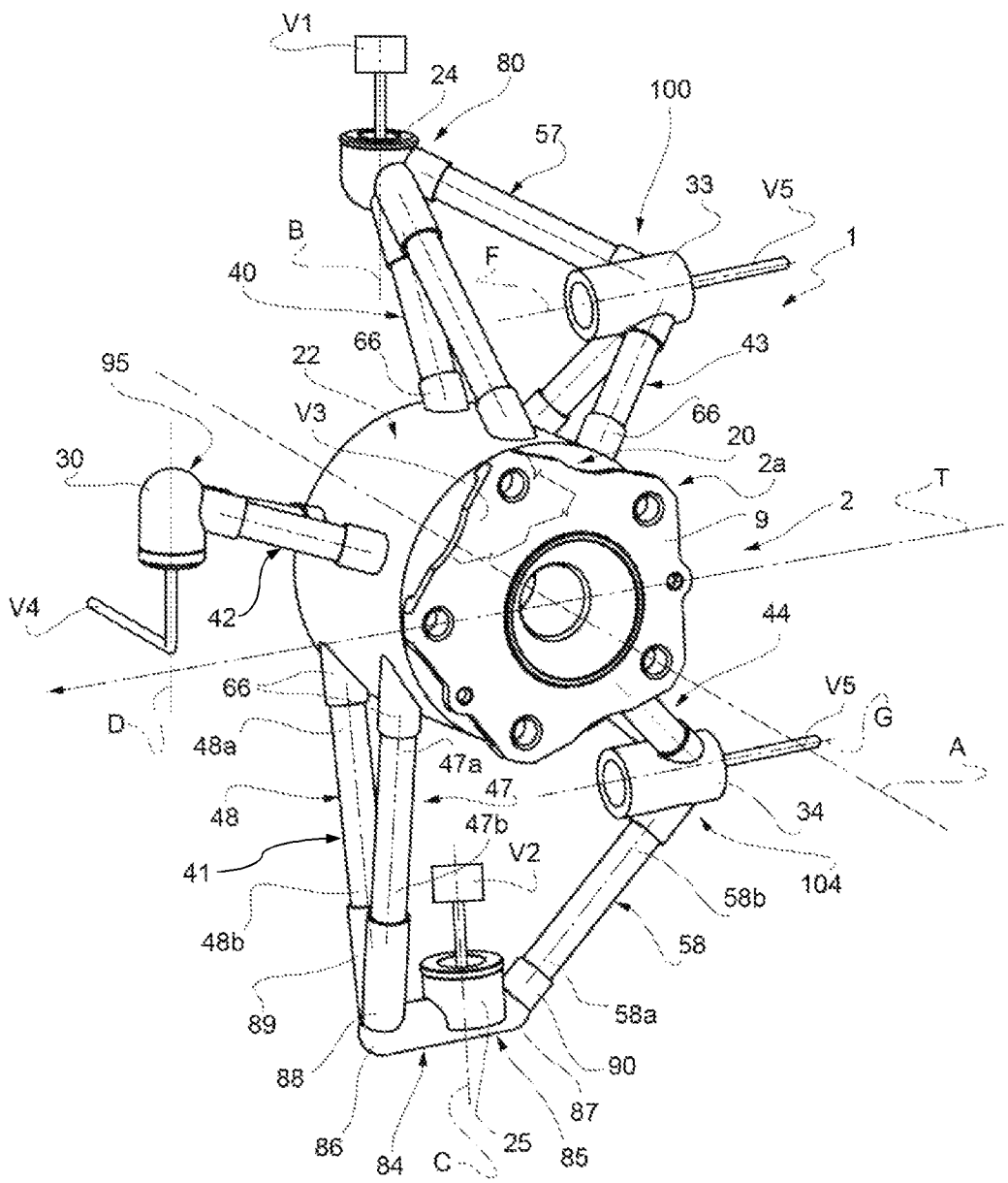
FIG. 1 is a perspective view of a lightweight suspension upright assembly for a vehicle according to the present invention.

With reference to FIG. 1, reference numeral 1 indicates, as a whole, a vehicle, of which only few parts are illustrated.

Here and in the following, terms such as "upper", "lower", "above", "below", "front", "rear", "horizontal", "vertical", etc. refer to the normal travel direction T of the vehicle 1.

The vehicle 1 comprises a not shown chassis and a front suspension assembly that is mounted to the chassis in a known manner and comprises an upper and a lower arm V1,V2 (schematically illustrated).

Furthermore, the vehicle 1 comprises a partially and schematically illustrated wheel rotor V3, a wheel (not shown) coaxial and fixed to the wheel rotor V3, and a lightweight suspension upright assembly or knuckle assembly 2, that is coupled to the upper and the lower arms V1,V2 and supports the wheel rotor V3.

Moreover, the vehicle 1 further comprises a steering system of which only a tie rod V4 is schematically illustrated. The tie rod V4 is coupled to the suspension upright assembly 2 and is operated such as to cause the rotation of the suspension upright assembly 2, the wheel rotor V3 and the wheel about a steering axis.

Besides, the vehicle 1 further comprises a braking system that is controlled to apply a braking force to the wheel rotor V3 and, in particular, comprises a brake caliper V5 (partially and schematically shown), attached to the suspension knuckle assembly 2, and a brake disk (not shown) coaxial and fixed to the wheel rotor V3.

Figure 5:
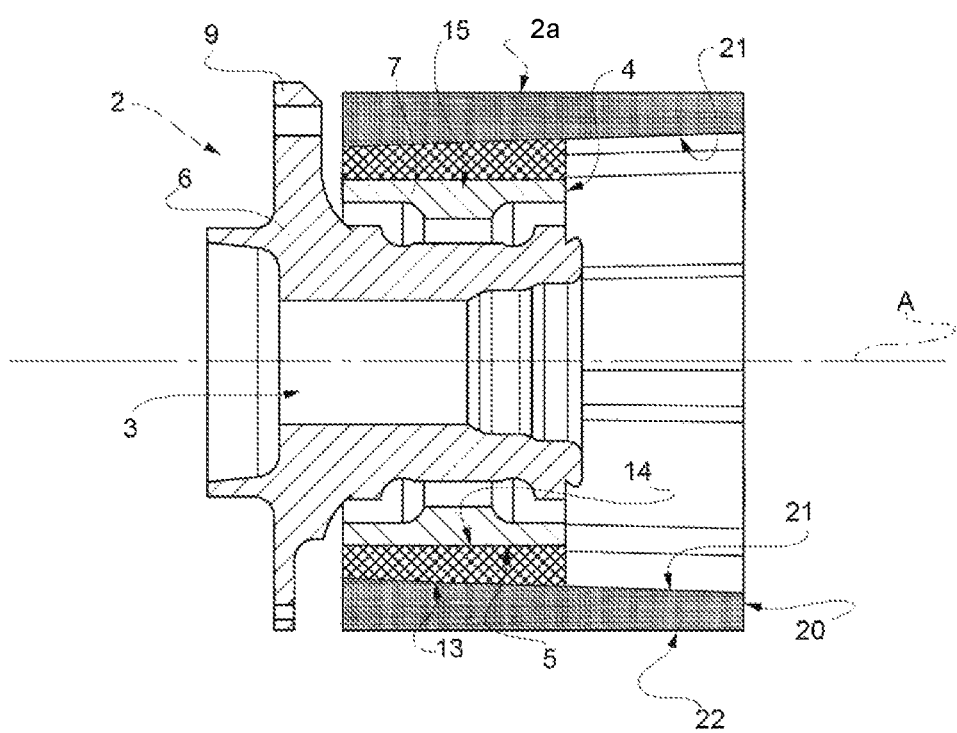
FIG. 5 is a cross section, in an enlarged scale and with parts removed for clarity, according to the section plane identified by line V-V in FIG. 2.

As better visible in FIG. 5, the lightweight suspension upright assembly 2 comprises a suspension upright or knuckle 2a and a wheel bearing module 3. In turn, the wheel bearing module 3 comprises a wheel bearing 4 and a bearing connection interface or layer 5, which is coaxial to the wheel bearing 4 along a substantially horizontal wheel axis A and connects the wheel bearing 4 to the suspension upright 2a.

The wheel bearing 4 comprises an inner ring 6 and an outer ring 7 that are coaxially arranged along axis A. The inner and the outer rings 6,7 are respectively coupled in fixed positions to the wheel rotor V3 and to the interface 5. In particular, the wheel bearing module 3 comprises a flange 9 integral to the inner ring 6 and fastened to the wheel rotor V3, e.g. by means of bolts.

The inner ring 6 is supported by the outer ring 7 through rolling elements (not shown), so as to be capable of rotating about axis A.

The bearing connection interface 5 is preferably defined by an annular body, which is arranged radially outside the outer ring 7, is fixedly coupled to the outer ring 7 and comprises a radially outer lateral surface 13 and a radially inner lateral surface 14.

The radially inner lateral surface 14 is mechanically coupled to the outer ring 7 and the radially outer lateral surface 13 is mechanically coupled to the suspension upright 2a.

Preferably, the bearing connection interface 5 is made of a composite material selected from the group consisting of BMC (Bulk Molding Compound), LFT (Long Fiber Thermoplastic) and DLFT (Direct Long Fiber Thermoplastic).

BMC, as well as LFT/DLFT, are synthetic plastic materials in which individual reinforcing fibers of considerable length (usually higher than ½ inch or 12 mm) are uniformly dispersed within a synthetic plastic matrix without a specific orientation (or oriented by the flow during the compression but never arranged in layers) while, e.g., in SMC (Sheet Molding Compound) the fibers are disposed in layers. In BMC materials the synthetic plastic matrix is generally formed by a thermosetting resin or, in some cases, a thermoplastic polymer, and such materials are adapted to be formed, generally, by compression molding; in LFT/DLFT materials the synthetic plastic matrix is formed by a thermoplastic resin and such materials are adapted to be formed by injection molding. Moreover, in both the BMC and LFT materials the reinforcing fibers are of uniform length.

Preferably, in the final molded material the individual reinforcing fibers form groups of fibers aligned with respect to each other, and the groups are uniformly dispersed randomly in the matrix, in order to give rise to a nearly isotropic material.

Conveniently, the BMC/LFT/DLFT connection interface 5 consists of 30-70% by volume of carbon fibers having an average length comprised between 10 mm and 50 mm and dispersed with random orientation in a polymer matrix.

Possibly, the fibers of the BMC/LFT/DLFT connection interface 5 are specifically oriented on purpose by mean of polymer process flow according to the expected loading paths on the suspension upright 2a in use, so that the fibers are subject mainly to compressive-tension loads. Nevertheless, such fibers are oriented to obtain preferably an isotropic distribution thereof and corresponding isotropic mechanical properties of the connection interface 5.

Alternately, glass or aramid fibers can be used in replacement of the carbon fibers or can be preferably mixed together with the latter.

The polymer matrix of the connection interface 5 may be a thermoset or a thermoplastic resin, optionally added with a filler. In particular, any available filler compatible with the carbon fibers and with the polymer matrix is suitable.

The polymer matrix is preferably formed by a plastic resin selected from the group consisting of: epoxy, polyamide, polyphenylene sulfide, Polyaryletherketone any mixture of the above.

In particular, during the manufacturing process, the BMC/LFT/DLFT interface 5 has been overmolded onto a radially outer lateral surface 15 of the outer ring 7, and cured to reach a completely or partially rigid state.

Preferably, the radially outer lateral surface 15 is not smooth so that the adhesion of the BMC connection interface 5 is increased. For instance, the radially outer lateral surface 15 has been knurled or lettered or otherwise machined using mechanical, chemical or optical processes such as to create a surface texture thereon that increases the surface area and/or defines microscopic interlocking roughness.

Alternatively or in addition, the radially outer lateral surface 15 has annular grooves that are centered on axis A and axially spaced apart from each other.

As an alternative or in combination to the BMC/LFT/DLFT, the interface 5 comprises a support ring made of metal and fitted directly onto the outer ring 7 in fixed position.

The suspension upright 2a further comprises a bushing or sleeve 20, which is made of a fiber reinforced polymer and is coaxially arranged around the outer ring 7.

The sleeve 20 has a radially inner lateral surface 21, in contact with the outer lateral surface 13, and a radially outer lateral surface 22.

Advantageously, the sleeve 20 is made of a material consisting of a synthetic polymer matrix reinforced with carbon fibers. In particular, the sleeve 20 is made of a BMC/LFT/DLFT, just as the connection interface 5. Moreover, the sleeve 20 may be made of the same BMC/LFT/DLFT of the connection interface 5.

Preferably, the connection interface 5 and the sleeve 20 are manufactured simultaneously to each other in a same mold by co-molding, and are then obtained in a completely cured state.

Alternatively, the sleeve 20 may be manufactured by overmolding such material onto the connection interface 5 in a partially cured state and afterwards curing completely such material, such to obtain a mechanical and chemical coupling between the outer lateral surface 13 and the completely cured sleeve 20.

According to a further non-shown alternative, the connection interface 5 is absent and the sleeve 20 is directly coupled to the outer ring 7. In particular, the sleeve 20 may be molded and afterwards fastened or fitted onto the outer ring 7; otherwise, the sleeve 20 may be overmolded onto the outer lateral surface 15.

With reference to FIG. 1, the suspension upright 2a further comprises an upper and a lower attachment member 24,25 carried by the sleeve 20 in respective fixed positions, that are substantially diametrically opposite with respect to axis A, respectively above and below the sleeve 20, and in particular are axially offset one with respect to the other.

Figure 3:
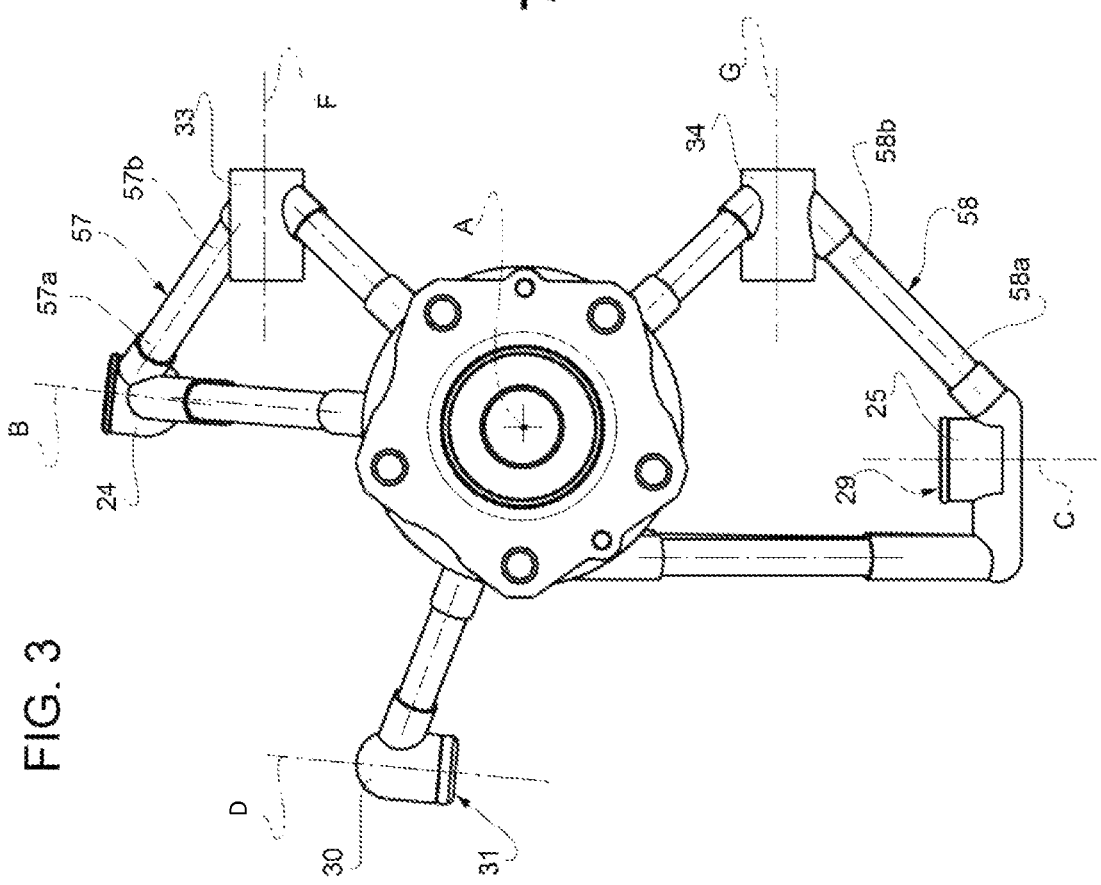

The attachment members 24,25 are attached respectively to the upper and the lower suspension arms V1, V2. In particular, the attachment members 24,25 define respective seats 28,29 (FIGS. 4 and 3) that are advantageously cylindrically shaped, are open upwards and have respective axes B, C. In particular, axis C is vertical and axis B is slightly inclined towards the front and the bottom of the vehicle 1 (FIG. 3). Alternatively, axes C, B may be differently oriented based on the particular design of the suspension assembly.

Moreover, according to the specific embodiment that is shown, the suspension upright 2a further comprises a steering arm attachment member 30 that is carried by the sleeve 20 in a front fixed position and is coupled to the tie rod V4. The attachment member 30 defines a seat 31 that is advantageously cylindrically shaped, is open downwards and has an axis D that is substantially vertical.

Furthermore, the suspension upright 2a comprises an upper and a lower brake caliper attachment member 33,34 that are both carried by the sleeve 20 in respective rear fixed positions, essentially symmetrical to each other with respect to the direction T and opposite to the position of the attachment member 30 with respect to the sleeve 20.

The attachment members 33,34 are both attached to the brake caliper V5 and are preferably defined by respective cylindrical tubes extending along respective axes F,G that are parallel to each other.

Alternatively, the brake caliper attachment members 33,34 and the steering arm attachment member 30 may have exchanged positions, i.e. being respectively placed at the front and at the rear of the vehicle.

According to an aspect of the present invention, the suspension upright 2a comprises a truss-structure connecting the attachment members 24,25,30,33,34 to the sleeve 20 and/or to each other.

The truss-structure comprise a plurality of rods that conveniently defines five arms 40,41,42,43,44 projecting from sleeve 20 and each connecting a respective attachment member 24,25,30,33,34 to the sleeve 20.

Figure 4:
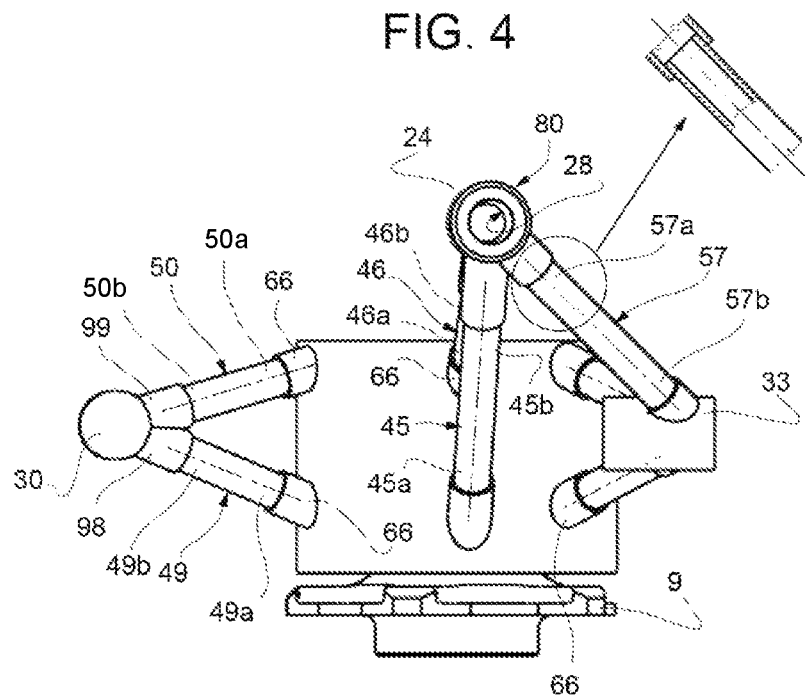

As illustrated in FIG. 4, the arm 40 preferably comprises two rods 45,46 that project from the sleeve 20 upwards, i.e. towards the attachment member 24. Preferably, the rods 45,46 are defined by respective tubes that, in particular, are cylindrically shaped. Rods 45,46 have respective axes that conveniently are coplanar to each other, along a plane on which preferably also axis A lies. Rods 45,46 are divergent toward the sleeve 20 and have respective ideal prolongations that intersect in a point arranged at or near the attachment member 24. In particular, the rod 45 is closer to the flange 9 than the rod 46 and has a lower slope than the rod 46 with respect to axis A.

The rods 45,46 have respective ends 45a,46a that are fixedly coupled to the sleeve 20 and respective ends 45b,46b that are axially opposite to ends 45a,46a and are connected to the attachment member 24, as better disclosed below.

As illustrated in FIG. 1, the arm 41 comprises two rods 47,48 that project from the sleeve 20 downwards and have respective axes that conveniently are coplanar to each other, along a plane that, in particular, is substantially vertical and is parallel to axis A. Such plane is spaced apart from axis A toward the front of the vehicle 1.

Preferably, also the rods 47,48 are defined by respective tubes that, in particular, are cylindrically shaped. The axes of rods 47,48 are divergent toward the sleeve 20. In particular, the axes of rods 47,48 have respective ideal prolongations that intersect in a point, which is located below the sleeve 20 and belongs to the above mentioned substantially vertical plane. In particular, the rod 47 is closer to the flange 9 than the rod 48 and have a slope that is opposite to that of the rod 48 with respect to axis A.

The rods 47,48 have respective ends 47a,48a that are fixedly coupled to the sleeve 20 and respective ends 47b,48b that are axially opposite to ends 47a,48a and are connected to the attachment member 25, as better disclosed below.

As illustrated in FIG. 4, the arm 42 comprises two rods 49,50 that project from the sleeve 20 forwards. Rods 49,50 have respective axes that preferably lie on a substantially radial plane, with respect to axis A.

Preferably, also the rods 49,50 are defined by respective tubes that, in particular, are cylindrically shaped. The axes of rods 49,50 are divergent toward the sleeve 20. In particular, the axes of rods 49,50 have respective ideal prolongations that intersect in a point that is located in front of the sleeve 20 and belongs to the above mentioned substantially radial plane. In particular, the rod 49 is closer to the flange 9 than the rod 50 and have a slope that is opposite to that of the rod 47 with respect to axis A.

The rods 49,50 have respective ends 49a,50a that are fixedly coupled to the sleeve 20 and respective ends 49b,50b that are axially opposite to ends 49a,50a and are connected to the attachment member 30, as better disclosed below.

Figure 2:
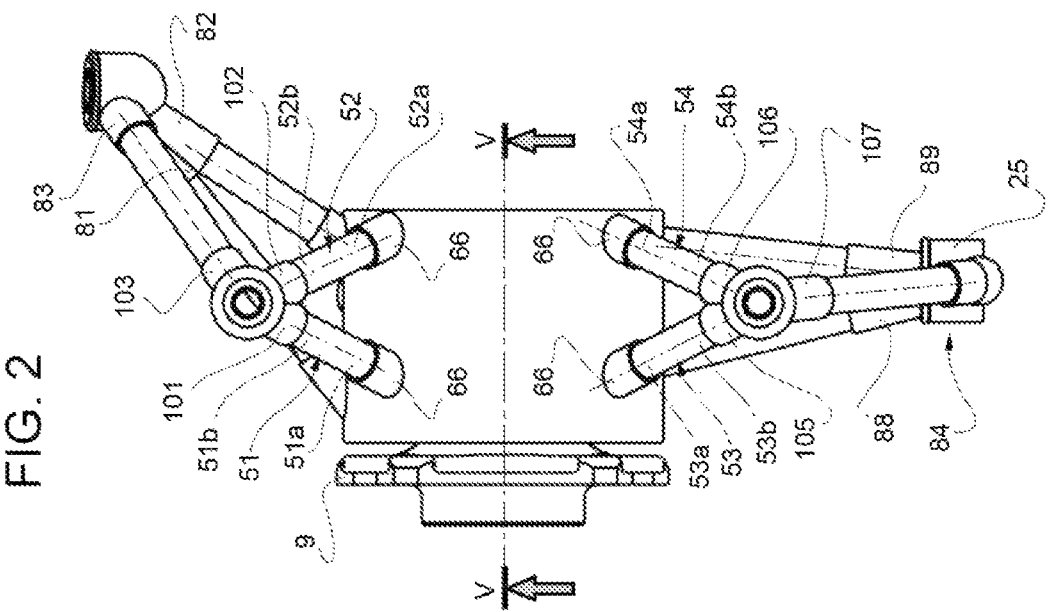
FIGS. 2, 3 and 4 are, respectively, a side view, a front view and a plan view of the suspension upright assembly of FIG. 1.

Moreover, as visible in FIG. 2, the arms 43,44 comprise respective couples of rods (i.e. an upper couple of rods 51,52 and a lower couple of rods 53,54) that project from the sleeve 20 rearwards, respectively toward the attachment members 33,34.

In particular, the arms 43,44 are substantially symmetrical to each other with respect to a horizontal plane defined by axis A and the direction T. In particular, rods 51,52 and rods 53,54 are coplanar along respective planes that preferably are substantially radial with respect to axis A. In particular, such planes are symmetrical to each other with respect to the above mentioned horizontal plane.

The axes of rods 51,52 and the axes of rods 53,54 are respectively divergent towards the sleeve 20. In particular, the axes of rods 51,52 and the axes of rods 53,54 have ideal prolongations that intersect in two points located at the rear of the sleeve 20, respectively at or near the attachment member 33 and the attachment member 34.

In particular, for each couple of rods 51,52 and rods 53,54, the rod axes have slopes that are opposite to each other with respect to axis A. Furthermore, the rods 51,53 are closer to the flange 9 than the rods 52,54.

Preferably, also the rods 51,52,53,54 are defined by respective tubes that, in particular, are cylindrically shaped.

The rods 51,52,53,54 have respective ends 51a,52a,53a,54a that are fixedly coupled to the sleeve 20 and respective ends 51b,52b,53b,54b that are axially opposite to ends 51a,52a,53a,54a and are connected to the attachment members 33,34, as better disclosed below.

Advantageously, the truss-structure comprises two additional rods 57,58 (FIGS. 1 and 3) that connect the attachment members 24,33 to each other and respectively the attachment members 25,34 to each other, so as to indirectly connect the arms 40,43 to each other and respectively the arms 41,44 to each other. The rods 57,58 preferably are defined by respective tubes that, in particular, are cylindrically shaped.

The rod 57 comprises two opposite ends 57a,57b respectively close to the attachment member 24 and the attachment member 33. Similarly, the rod 58 comprises two opposite ends 58a,58b respectively close to the attachment member 25 and the attachment member 34.

According to a preferred aspect of the invention, at least some of the rods 45,46,47,48,49,50,51,52,53,57,58 have respective cross-sections that are constant along their axes. In particular, such axes are rectilinear. Conveniently, for at least some of the rods 45,46,47,48,49,50,51,52,53,57,58, their cross sections are equal to each other. More conveniently, the cross sections are annular.

According to another aspect of the invention, the rods of the truss-structure are made of a fiber-reinforced polymer, e.g. the same BMC of the sleeve 20. Conveniently, the fiber used to manufacture the rods of the truss-structure are oriented parallel to the axes of such rods.

According to another aspect of the invention, the rods of the truss-structure are manufactured before being assembled in the suspension upright assembly 2. Preferably, the rods of the truss-structure are manufactured by pultrusion, or by filament winding, or by braiding.

According to a further preferred aspect of the invention, the sleeve 20 comprises a plurality of lugs 66 projecting from the outer lateral surface 22, respectively coaxial to the rods 45,46,47,48,49,50,51,52,53,54 and fixedly coupled to the ends 45a,46a,47a,48a,49a,50a,51a,52a,53a,54a, in particular by male-female couplings (FIG. 4). In particular, lugs 66 have respective seats, which are fixedly engaged by the ends 45a,46a,47a,48a,49a,50a,51a,52a,53a,54a, in particular by interference fit.

Lugs 66 are made of a fiber-reinforced polymer, as they are parts of the sleeve 20. Conveniently, the fibers in the polymer matrix of the lugs 66 are oriented parallel to the respective axes thereof.

The suspension upright 2a further comprise an upper joint 80 that interconnect the ends 45b,46b,57a to each other and, preferably, comprises the attachment member 24.

The upper joint 80 comprises three lugs 81,82,83, (FIG. 2) which are coaxial and fixedly coupled to ends 45b,46b,57a and, in particular, project directly from the attachment member 24.

Furthermore, the suspension upright 2a comprise a lower joint 84 that interconnect the ends 47b,48b,58a and, preferably, comprises the attachment member 25.

The lower joint 84 comprises a support portion 85, (FIG. 1) which preferably is elongated, is arranged below the attachment member 25, extends substantially parallel to the direction T and has a front end 86 and a rear end 87.

The lower joint 84 comprises three lugs 88,89,90, which are coaxial and fixedly coupled to ends 47b,48b,58a. In particular, lugs 88, 89 project upwardly from the front end 86, while lug 90 projects upwardly from the rear end 87.

The support portion 85 further has an intermediate zone, from which the attachment member 25 projects upwards.

Moreover, the suspension upright 2a comprises a front joint 95 that interconnects the ends 49b,50b to each other and, preferably, comprises the attachment member 30.

The front joint 95 comprises two lugs 98,99 (FIG. 4) which are coaxial and fixedly coupled to the ends 49b,50b and, in particular, project directly from the attachment member 30.

Furthermore, making reference to FIG. 1, the suspension upright 2a comprises a rear upper joint 100 that interconnects the ends 51b,52b,57b to each other and, preferably, comprises the attachment member 33.

The rear upper joint 100 comprises three lugs 101,102, 103, (FIG. 2) which are coaxial and fixedly coupled to the ends 51b,52b,57b and, in particular, project from the attachment member 33.

Correspondingly, the suspension upright 2a comprises a rear lower joint 104 that interconnects the ends 53b,54b,58b to each other and preferably comprises the attachment member 34. The rear lower joint 104 comprises three lugs 105,106,107 (FIG. 2) that are respectively coaxial and fixedly coupled to the ends 53b,54b,58b and, in particular, project from the attachment member 34 and rods 53,54.

In particular, lugs 81,82,83,88,89,90,98,99,101, 102,103, 105,106,107 are coupled to the respective rods by male-female couplings. In particular, such lugs have respective seats, which are fixedly engaged by the corresponding rod ends, in particular by interference fit.

According to another preferred embodiment of the present invention, joints 80,84,95,100,104 are made of a fiber-reinforced polymer, e.g. the same BMC of the sleeve 20. Conveniently, the fibers in the polymer matrix of the lugs 81,82,83,88,89,90,98,99,101,102,103,105,106,107 are oriented parallel to the respective axes thereof.

During the manufacturing process of the suspension upright 2a, according to a preferred embodiment, the sleeve 20 including the integrated lugs 66 is molded, the joints 80,84,95,100,104 are molded separately from the sleeve 20 and the rods 45,46,47,48,49,50,51,52,53,54,57,58 are coupled to the molded sleeve 20 and the molded joints 80,84,95,100,104, so to form the abovementioned truss-structure.

According to a variant, at least one of the joints 80,84, 95,100,104 is obtained by molding two separate half-shells, each having corresponding half portions of the lugs, and, afterwards, by welding such half-shells over the corresponding rod ends.

According to an alternative of the manufacturing process, the sleeve 20 and/or one or more joints 80,84,95,100,104 are overmolded onto the rod ends and possibly cured, so as to embed such rod ends into lugs of the sleeve 20 and/or into lugs of the joints 80,84,95,100,104.

From the foregoing, the advantages of the suspension upright assembly 2 are evident to a skilled person in the field.

In particular, the implementation of a fiber reinforced truss-structure to connect the attachment members 24,25, 30,33,34 to the sleeve 20 and/or to each other allows the suspension upright 2a to be extremely simple to be manufactured and contemporary having a light weight, stiffness and strength to traction and compression loads.

The rods 45,46,47,48,49,50,51,52,53,54,57,58 are all lightweight, as being made of a fiber reinforced composite material, and efficient in responding to high compression and tensile stresses. In particular, the efficiency increases if the fibers in the polymer matrix are appropriately oriented in each of the rods 45,46,47,48,49,50,51,52,53,54,57,58 e.g. parallel to their respective axes.

The rods 45,46,47,48,49,50,51,52,53,54,57,58 are manufactured independently from the manufacturing of the sleeve 20 and the joints 80,84,95,100,104, so that the process for manufacturing such rods can be standardized, but different truss-structure can be assembled according to the specific needs and the specific features of the upright 2a, in particular the positions and numbers of the attachment members and the load values to be supported.

Therefore, the manufacturing of the rods 45,46,47,48,49, 50,51,52,53,54,57,58 can be performed via simple and cost-effective processes and does not strictly require the use of different and dedicated molds.

In particular, since the rods 45,46,47,48,49,50,51,52,53, 54,57,58 have all the same constant cross-section along their respective axes, a single machine or die can be used to manufacture all the rods 45,46,47,48,49,50,51,52,53,54,57, 58.

In the meantime, in the design stage there is a high flexibility in setting the cross section, the diameter, the length the number and the positions of the rods of the truss-structure.

In particular, a particular lightweight structure can be obtained by using tubular rods, or by using a cross-section having a T-shape, a H-shape or a U-shape, so as to optimize the compromise between lightweight and stiffness.

Eventually, it results evident from the foregoing that many modifications to the disclosed suspension upright assembly 2 may be carried out without exiting from the scope of protection as defined in the appended set of claims.

In particular, the rods of the truss-structure can be in a number different from the one described and illustrated. For instance, each of the attachment members 24,25,30,33,34, may be connected to the sleeve 20 through a single rod or more than two rods; and/or the truss-structure can be applied only to one or to some of the attachment members 24,25, 30,33,34 (while the other ones may be connected to the sleeve 20 by means of traditional composite blades); and/or attachment members 24,25,30,33,34 may be connected to each other by multiple rods.

Besides, some of the disclosed attachment members 24,25,30,33,34 may be absent; in particular, the attachment member 30 is not present if the suspension upright 2a is provided for a non-steering wheel.

The rods 45,46,47,48,49,50,51,52,53,54,57,58 of the truss-structure may have a different cross-section and/or a different size, with respect to the ones disclosed above; for instance, the rods 45,46,47,48,49,50,51,52,53,54,57,58 may have a slightly conical external shape, instead of cylindrical.

Finally, the attachment members 24,25,30,33,34 can be defined by elements fixed to the joints, instead of being parts of such joints; and/or the rods of the truss-structure may be connected to the attachment members 24,25,30,33,34 and/or to the sleeve 20 without lugs, i.e. in a manner different from the specific embodiments that have been described above.

What is claimed is:

1. A suspension upright assembly for a vehicle comprising:
   a wheel hub bearing comprising an outer ring and an inner ring that extends coaxially with the outer ring along an axis (A), is axially rotatable and is suitable to be coupled to a wheel rotor of the vehicle;
   a suspension upright comprising:
   a) a fiber-reinforced composite bushing that is arranged around the wheel hub bearing, in a fixed position and coaxially with respect to the outer ring;
   b) a plurality of attachment members for attaching the suspension upright at least to a suspension assembly and/or a brake caliper of the vehicle;
   c) connecting means coupling the attachment members to the bushing in respective fixed positions; wherein the connecting means comprise a fiber-reinforced composite truss-structure that connects at least one of the attachment members to the bushing and/or to a further one of the attachment members,
   wherein the truss-structure comprises at least two fiber-reinforced composite rods that are coplanar to each other along a plane, the plane being parallel to the axis (A).

2. The suspension upright assembly according to claim 1, wherein the at least two fiber-reinforced composite rods outwardly project from the bushing and connect one of the attachment members to the bushing.

3. The suspension upright assembly according to claim 2, characterized in that the bushing has an outer lateral surface and comprises at least two bushing lugs, that outwardly project from the outer lateral surface; the rods having respective first ends, each fixedly coupled to a corresponding one of the bushing lugs.

4. The suspension upright assembly according to claim 2, wherein the suspension upright comprises at least one joint, which comprises or supports one of the attachment members and comprises at least two joint lugs; the rods having respective second ends that are fixedly coupled respectively to the joint lugs.

5. The suspension upright assembly according to claim 2, wherein the rods extend along respective rod axes that are divergent towards the bushing.

6. The suspension upright assembly according to claim 2, wherein at least one of the rods is defined by a tubular element.

7. The suspension upright assembly according to claim 2, wherein the rods have respective rod axes and respective cross-sections; the cross-sections being constant along the rod axes.

8. The suspension upright assembly according to claim 2, wherein the truss-structure comprises:
   a first and a second arm, which comprise respectively a first and a second couple of rods; and
   an additional rod arranged between the first and second arm to connect the first and second arms to each other.

9. The suspension upright assembly according to claim 8, wherein the additional rod connects two of the attachment members to each other.

10. The suspension upright assembly according to claim 1, wherein the attachment members comprise two brake caliper attachment members having respective seats that are parallel to each other for the attachment of the brake caliper; the truss-structure comprising two brake caliper arms, each comprising a respective couple of rods and supporting a respective one of the brake caliper attachment members.

11. A suspension upright assembly for a vehicle comprising:
    a wheel hub bearing comprising an outer ring and an inner ring that extends coaxially with the outer ring along an axis (A), is axially rotatable and is suitable to be coupled to a wheel rotor of the vehicle;
    a suspension upright comprising:
    a) a fiber-reinforced composite bushing that is arranged around the wheel hub bearing, in a fixed position and coaxially with respect to the outer ring;
    b) a plurality of attachment members for attaching the suspension upright at least to a suspension assembly and/or a brake caliper of the vehicle;
    c) connecting means coupling the attachment members to the bushing in respective fixed positions; wherein the connecting means comprise a fiber-reinforced composite truss-structure that connects at least one of the attachment members to the bushing and/or to a further one of the attachment members,
   wherein the truss-structure comprises at least two fiber-reinforced composite rods outwardly projecting from the bushing and connecting one of the attachment members to the bushing, the rods having respective rectilinear rod axes and respective cross-sections; the cross-sections being constant along the rod axes.

* * * * *